United States Patent

[11] 3,573,639

[72] Inventors Arthur J. Metz
Portland, Oreg.;
Robert H. Howard, Hickory Hills, Ill.
[21] Appl. No. 882,247
[22] Filed Dec. 4, 1969
[45] Patented Apr. 6, 1971
[73] Assignee The United States of America as represented by the United States Atomic Energy Commission

[54] RATEMETER WITH AUTOMATIC DEAD-TIME CORRECTION
5 Claims, 4 Drawing Figs.
[52] U.S. Cl.................................................. 328/127,
250/83.6, 235/151.3
[51] Int. Cl......................................................... H03k 5/00,
H03k 21/00
[50] Field of Search........................................... 250/71.5,
83.6 (R), 71. (R), 83. (R); 235/151.3; 313/93
(AR); 250/83.6 (W); 328/127, 159

[56] References Cited
UNITED STATES PATENTS
3,037,118  5/1962  Bryant.......................... 250/83.6

Primary Examiner—James W. Lawrence
Assistant Examiner—Dave C. Nelms
Attorney—Roland A. Anderson ABSTRACT: A pulse rate meter receiving from a signal handling system having a variable dead time during a time $T$ a train of random pulses having varying pulse widths includes a first circuit for producing an output signal whose amplitude is proportional to the ratio of the summed time intervals between pulses in the train of random pulses and the time $T$, a second circuit for producing, responsive to each random pulse, an output pulse whose width is inversely proportional to the output signal of the first circuit, and a third circuit for integrating the output pulses of the second circuit to produce a rate meter output which is representative of the true pulse rate input to the signal handling system.

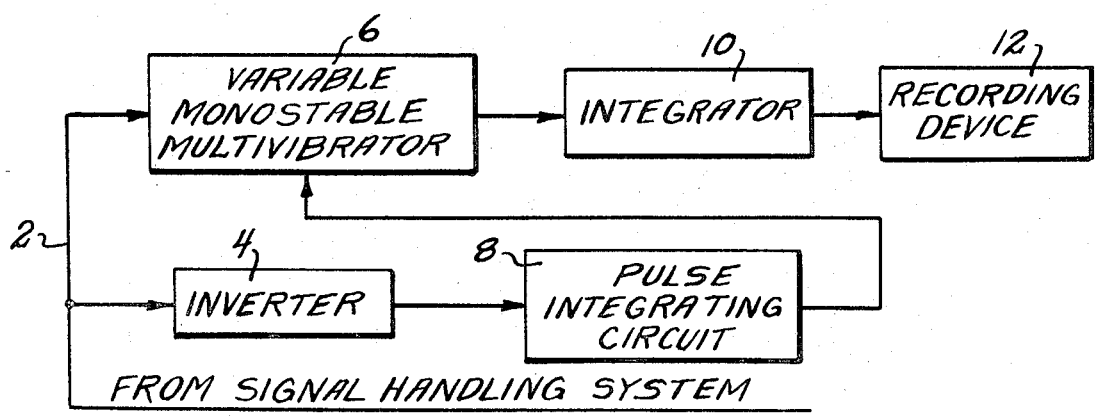
FIG-1
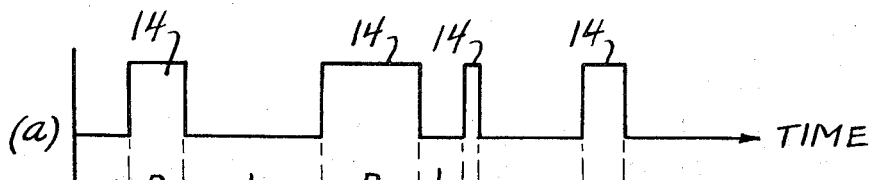
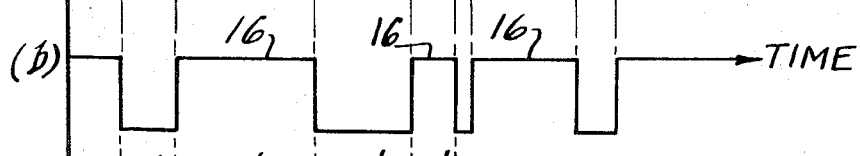
FIG-2
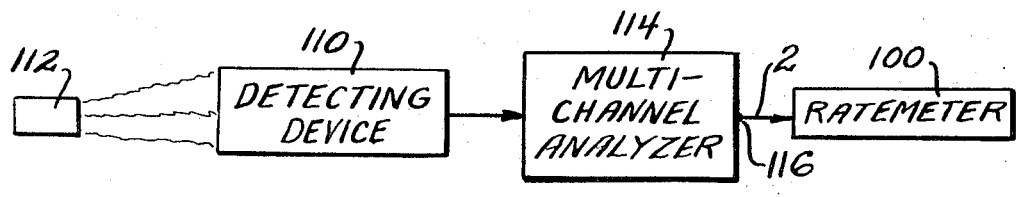
FIG-4
Inventors
Arthur J. Metz
Robert H. Howard
Attorney

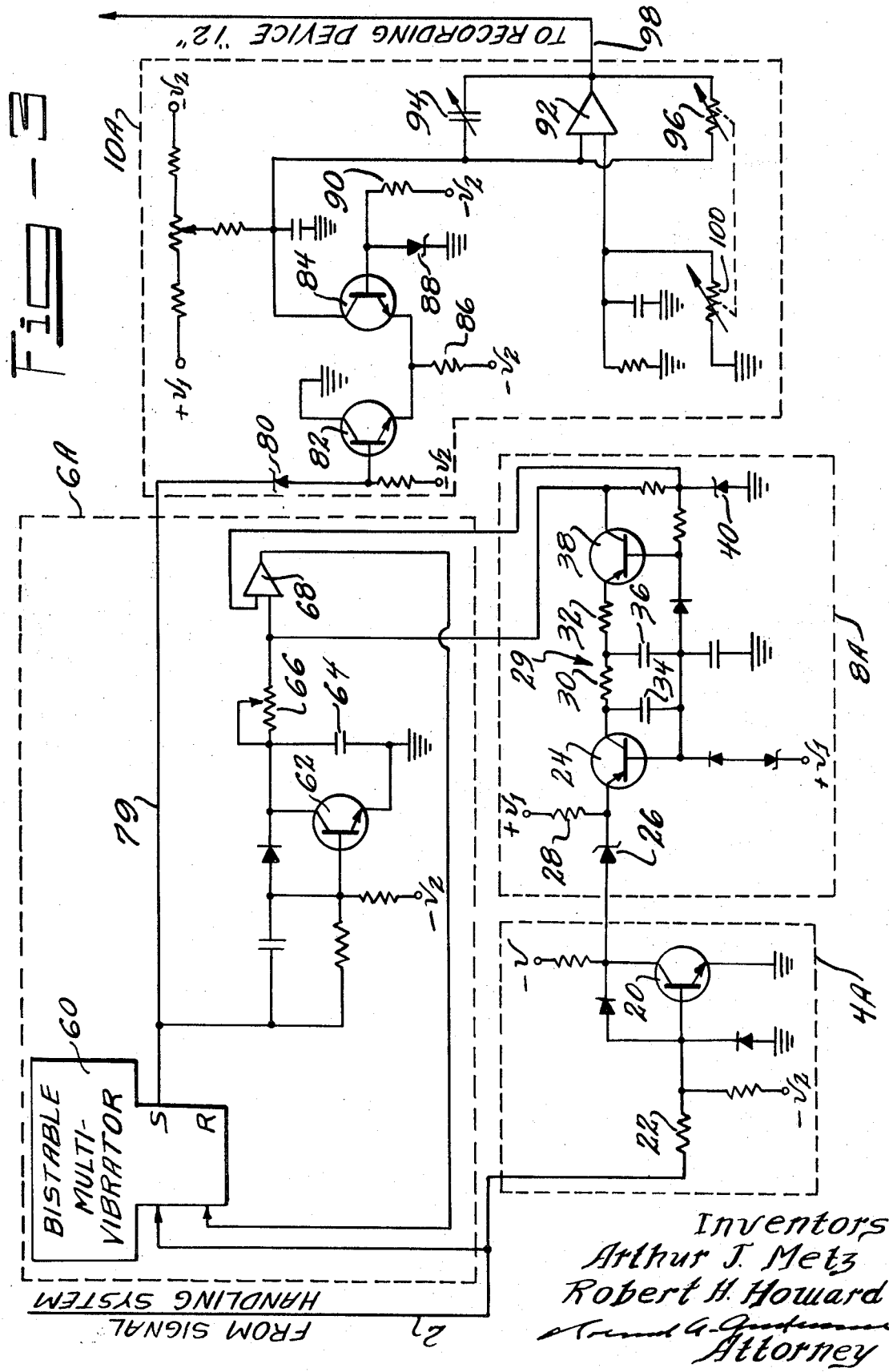

RATEMETER WITH AUTOMATIC DEAD-TIME CORRECTION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to pulse counting devices and more particularly to a pulse rate meter which corrects the output pulse rate of a signal handling system for pulse losses due to the variable dead time of the system.

Consider a train of random pulses having equal pulse widths $D$ occurring during a time $T$. The pulse rate $R$ of such a pulse train during the time $T$ is defined as the total number of pulses $P$ in the pulse train divided by the time $T$, or, $$R \; P/T \qquad (1)$$

The pulse rate $n$ of such a pulse train over a time equal to the summed time intervals between pulses is then given by:

$$n = \frac{P}{T - PD} \qquad (2)$$

or, using equation (1)

$$n = \frac{R}{1 - RD} \qquad (3)$$

Thus, once the pulse rate $R$ of such a train of random pulses is measured and the pulse width $D$ of the pulses is known, the pulse rate $n$ over a time equal to the summed time intervals between pulses may be calculated using equation (3). If however, the pulse width $D$ varies from pulse to pulse, the calculation of the pulse rate $n$ using equation (3) becomes very difficult or impossible.

The need for obtaining the pulse rate $n$ over a time equal to the summed time intervals between pulses in a random pulse train when the width of the pulses in the train varies may be appreciated by considering systems which perform a cycle of operation responsive to an event or impulse such as, for example, nuclear event detecting and counting systems. Many of such systems are insensitive to another event occurring during the cycle time period or, at least, during an initial part of the cycle time period. This time of insensitivity is usually referred to as the dead time of the system. When such a system is to detect random events, and if a pair of successive events thereof are separated in time less than the dead time of the system, then one event of the pair will not initiate a cycle of operation. Assuming that such a system generates an output pulse train having pulse rate representative of the rate of the random input events which output pulse train initiates a cycle of operation, then a correction must be made if the pulse rate of the output pulse train is to represent the true event rate at the system input. If the dead time of the system is known and constant, then the true event rate may be obtained by connecting a rate meter to the system output and adding the rate meter output to the system output. The rate meter output is set using equation (3) by letting $R$ equal the rate meter output and $D$ equal the dead time of the system. If, however, the dead time of a system varies due to instability or pulse rate effects of the system or the dead time of a system is a function of some other parameter, calculated corrections using equation (3) become very difficult or impossible as noted hereinbefore. For example, in a nuclear event detecting and counting system, including a multichannel analyzer, the time for detecting, measuring, and storing of input pulses, i.e., the dead time of the multichannel analyzer, is a function of the input pulse amplitude and thus the average multichannel dead time is spectrum dependent.

It is therefore an object of the present invention to provide for a random event responsive system having a finite dead time, an apparatus for generating an output therefrom representative of the random input to said system.

It is another object of the present invention to provide means for generating an output representative of the true pulse rate of a train of random pulses having varying pulse widths applied to a detecting system having a variable dead time.

It is yet another object of the present invention to provide means for correcting the output rate of a system for losses in the system input rate due to variable dead time losses of the system.

SUMMARY OF THE INVENTION

In general the apparatus of the present invention operates on the output random-width-pulse train from a signal handling system and includes means for generating a first signal proportional to the ratio of the summed time intervals between the pulses in said train to the total time of the train. Means also are provided for generating a second signal which is proportional to the ratio of the pulse repetition rate of the pulses in said output pulse train to said first signal, which signal is proportional to the true pulse rate of the random-pulse train input to the signal handling system.

BRIEF DESCRIPTION OF THE DRAWINGS

A more complete understanding of the invention will best be obtained from consideration of the accompanying drawings in which:

FIG. 1 illustrates by block diagram a general embodiment of an apparatus of the present invention;

FIG. 2 illustrates representative waveforms of a random pulse train at various points of the apparatus of FIG. 1;

FIG. 3 is a detailed circuit diagram of the embodiment of FIG. 1; and

FIG. 4 illustrates an examplary use of the general embodiment of FIG. 1 with a nuclear event detecting and counting system producing a train of output pulses having varying time durations representative of the varying dead time of the system.

PREFERRED EMBODIMENT OF THE INVENTION

Proper understanding of the preferred embodiment is aided by observing that in equation (2) the quantity $(T-PD)$ represents the total summed time intervals between pulses of the random pulse train. Dividing both numerator and denominator in equation (2) by the time $T$ results in $$n = \frac{R}{(T - PD)/T} \qquad (4)$$

The application of equation (4) to the random-width-pulse train output of a signal handling system to provide a measure of the true rate of the input pulse train to the system may be further appreciated by considering FIG. 1. In FIG. 1, an output line 2 from the signal handling system (not shown) is connected to the input of an inverter 4 and a first or trigger input of a variable monostable multivibrator 6. The output of the inverter 4 is connected to a pulse integrating circuit 8. A second or control input to the monostable multivibrator 6 is connected to the output of the pulse integrating circuit 8. A conventional integrator 10 has an input connected to the output of the multivibrator 6 and has an output connected to a recording device 12.

In operation of the device, an output train of random pulses 14 from the signal handling system, such as the pulse train shown in FIG. 2 $a$, having variable pulse widths $D$ and variable pulse spacings $L$ is applied to the input of inverter 4 and the first input of the monostable multivibrator 6 via the line 2. Responsive to the pulse train on line 2, inverter 4 produces a train of pulses 16 having pulse widths $D'$ and pulse spacings $L'$ respectively equal to the pulse spacing and the pulse width of the associated pulses 14 of the pulse train on line 2, as shown in FIG. 2. During a given time $T$, integrating circuit 8 integrates the pulses 16 to produce an output current $I$ the amplitude of which is proportional to the ratio of the total summed time intervals $L$ between the pulses 14 to the time $T$. Responsive to each pulse 14 of the pulse train on line 2 and the amplitude of the output current $I$ of the integrating circuit 8, monostable multivibrator 6 produces an output pulse having a pulse width $t$ proportional to $1/I$, or, $$t = t_o \frac{1}{(T-PD)/T} \quad (5)$$

where $t_o$ is a constant and is the maximum output pulse width of the monostable multivibrator 6. The triggering rate of the monostable multivibrator 6 is determined by the number of pulses in the pulse train divided by the time duration of the train ($P/T=R$) and the input to the integrator 10 is proportional to the product of the pulse width $t$ and the triggering rate of the monostable multivibrator 6. Thus, the output of the integrator 10, as recorded by recording device 12, is proportional to $$\frac{R}{(T-PD)/T}$$

that is, equation (4). Since $$\frac{1}{(T-PD)/T}$$

represents the ratio of summed time intervals between pulses in the pulse train to the total pulse train time, it also represents the percentage live time of the signal handling system which generated the pulse train. Thus, $$\frac{R}{(T-PD)T}$$

represents the ratio of the pulse repetition rate of the random-pulse output train to the percentage live time of the signal handling system, which signal is representative of the true pulse rate input to the signal handling system.

Referring to FIG. 3, a detailed schematic diagram is illustrated of the preferred embodiment for the practice of the present invention. In FIG. 3, the blocks similar to the inverter 4, monostable multivibrator 6, pulse integrator 8 and integrator 10 of FIG. 2 are outlined by broken lines and designated 4A, 6A, 8A and 10A respectively.

An output random-pulse train, such as the aforedescribed pulse train shown in FIG. 2 $a$, is applied to the base of a transistor 20 via resistor 22. Responsive to this pulse train, transistor 20 produces at its collector the inverted representation of the received pulse train, as shown in FIG. 2 $b$. The pulse width of a pulse produced at the collector of transistor 20 is equal to the time interval between an associated pair of successive random pulses of the applied pulse train.

In the pulse integrating circuit 8A a transistor 24, connected to the collector of transistor 20 via a Zener diode 26, is biased to pass a quiescent current from a positive voltage source $V_1$, via a resistor 28, to an integrating network 29 comprising resistors 30 and 32 and capacitors 34 and 36. Each pulse appearing at the collector of transistor 20 biases transistor 24 off for a time duration equal to the pulse width of the pulse. The collector current of the transistor 24 is integrated by the integrating network 29 and applied to the emitter of a transistor 38. Transistor 38 produces at its collector a current $I$ proportional to the output of the integrating network 29 and hence proportional to the ratio of the summed time intervals between pulses of the random-pulse train and the time $T$ of the train $$\left( \frac{T-PD}{T} \right)$$

The output current $I$ of the transistor 38 is applied to a control input of the monostable multivibrator circuit 6A.

In the monostable multivibrator circuit 6A each pulse in the applied output random-pulse train from the signal handling system triggers a bistable multivibrator 60 to the set state. The set output of the bistable multivibrator 60 turns off a normally conducting transistor 62, thereby allowing the current $I$ from the output of transistor 38 to charge via a variable resistor 66 a capacitor 64 connected across the emitter and collector terminals of transistor 62. A comparator 68, comprising a differential amplifier, receives at a first input a predetermined threshold voltage $V_3$ produced across a Zener diode 40 in the pulse integrating circuit 8A. A second input of the comparator 68 is connected to the capacitor 64, via the variable resistor 66. When the voltage at the second input reaches the threshold voltage at the first input of the comparator 68, a pulse is produced at the comparator output which resets the bistable multivibrator 60 to the reset state thereby turning on transistor 62. When transistor 62 turns on, the capacitor 64 is quickly discharged. Bistable multivibrator 60 remains in the reset state until the next random pulse on the applied random-pulse train, at which time the aforedescribed charging of the capacitor 64 repeats.

Responsive to the pulses of the applied output pulse train from the signal handling system, bistable multivibrator 60 produces a train of pulses on line 79 connected to the set output of the bistable multivibrator. With the inherent delay times of the circuits in the monostable multivibrator 6A being an insignificant percentage of the time duration of the set state of the bistable multivibrator 60, the pulse width $t$ of pulses on line 79 is inversely proportional to the magnitude of the current $I$ from the pulse integrating circuit 8A. Where the inherent delay times of the monostable multivibrator 6A are significant, compensation for the inherent delays should be effected. Such compensation provides that a constant time $\Delta t$ equal to the total inherent delay time is subtracted from each pulse width $t$ on line 79 for the entire range of possible values of $t$ whereby $\Delta t$ is independent of the current $I$. This compensation is performed by the variable resistor 66 connected between capacitor 64 and the output of transistor 38 producing the current $I$. It is to be noted that the inherent delay time has the same effect on the pulse width of the pulses on line 79 as an increase in the threshold voltage $V_3$ applied to comparator 68 by a voltage $\Delta V$. Thus a reduction of the threshold by $\Delta V$ will reduce the pulse width $t$ by the constant time $\Delta t$ if $\Delta V$ varies in proportion to the current $I$. Since $$\Delta t = C/I \quad V \quad (6)$$

and $$\Delta V = IR, \quad (7)$$

wherein $C$ and $R$ denote the capacitance and resistance of the capacitor 64 and the resistor 66, one obtains $$\Delta t = RC \quad (8)$$

Thus, by adjusting the variable resistor 66 in accordance with equation (8) the pulse width of the pulses on line 79 is inversely proportional to the current $I$.

Integrator 10A comprises a pair of transistors 82 and 84 acting as a current switch controlled by the set output of the bistable multivibrator 60, and a high gain operational amplifier 92 with feedback including parallel connected variable capacitor 94 and variable resistor 96. The emitters of the pair of transistors 82 and 84 are connected to a negative voltage source $V_2$, via a common resistor 86. The base of transistor 82 is connected to the set output of the bistable multivibrator 60 via line 79 and a Zener diode 80. The base of transistor 84 is connected to the constant voltage output of a Zener diode 88 which in turn is serially connected with a resistor 90 across a negative potential source $V_2$ and a ground reference potential. The collectors of transistors 82 and 84 are respectively connected to a ground reference potential and a first input of an operational amplifier 92. In the reset state of the bistable multivibrator 60, transistor 82 is conducting and transistor 84 is cut off. In the set state of the bistable multivibrator 60, transistor 82 is cut off and transistor 84 is conducting. A predetermined current from negative voltage source $V_2$ is thus switched between transistor 82 and transistor 84 responsive to the set and reset state of the bistable multivibrator 60. During the set state of the bistable multivibrator 60 the current through conducting transistor 84 is integrated by operational amplifier 92 to produce an output on line 98 representative of $$\frac{R}{(T-PD)/T}$$

which as previously explained is representative of the true pulse rate input to the original handling system.

The rate range of the integrator 10A may be adjusted by varying feedback resistor 96 and zeroing of the integrated effected by adjusting a variable resistor 100 connected between a ground reference potential and a second input to amplifier 92. The integrating time constant of the integrator 10A may be adjusted by varying the capacitance of feedback capacitor 94.

Referring now to FIG. 4, the embodiments of FIGS. 1 and 3 are denoted as rate meter 100 and are shown connected to the output of a pulse handling system, comprising a multichannel analyzer 114. The rate meter 100 compensates the output pulse rate of the pulse handling system for varying system dead time losses to produce an output representative of the true input pulse rate to the system.

A detecting device 110, such as a scintillation detector, produces responsive to random nuclear events generated by a radioactive sample 112 output pulses having pulse heights proportional to the energy associated with the detected nuclear events. The multichannel analyzer 114 is connected to the output of the detecting device 110 to produce the energy spectrum of the radioactive sample by classifying and storing the output pulses of the detecting device 110 according to pulse height. Upon receipt of an input pulse from the detecting device 110, the multichannel analyzer 112 generates at an output terminal 116 thereof a so-called "multichannel busy" pulse having a pulse width equal to the multichannel analyzer dead time, i.e., the time required to classify and store the input pulse. The multichannel analyzer 114 is insensitive to pulses from the detecting device 110 occurring during the multichannel analyzer dead time, hence any such input pulses occurring at this time are not counted by the multichannel analyzer. Furthermore, the dead time of the multichannel analyzer 114 depends upon the pulse height of the output pulses from the detecting device 110. The output at the multichannel analyzer output terminal 116 is thus a random train of pulses with varying pulse width, such as, for example, the pulse train of FIG. 2a. The true pulse rate of the random output pulses of the detecting device 110 is then obtained from the multichannel analyzer output pulse train by the rate meter 100 as described hereinbefore.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

We claim:

1. In combination with a signal handling system producing a train of random pulses having random pulse widths an apparatus comprising means for generating a first signal proportional to the ratio of the summed time intervals between said pulses to the total time of said train and means for generating a second signal which is proportional to the ratio of the pulse repetition rate of the pulses in said train to said first signal, which second signal is proportional to the true pulse rate of input pulses to said signal handling system.

2. The apparatus of claim 1 wherein said first signal generating means comprise inverting means receiving said pulse train for generating output pulses each proportional to an associated time interval between successive pulses in said train of pulses, and means for integrating the output pulses of said inverting means, the output of said integrating means being representative of the ratio of the summed time intervals between pulses in said pulse train to the total time of said train.

3. The apparatus of claim 1 wherein said second signal generating means comprise means for generating responsive to each pulse in said train of pulses an output pulse whose width is inversely proportional to said first signal, and means for integrating each of said output pulses to produce said second signal proportional to the true pulse rate of input pulses to said signal handling system.

4. The apparatus of claim 1 wherein said second signal generating means comprise bistable means coupled to said pulse train to effect a set state therefor for each of the pulses in said train, means responsive to the set state of said bistable means for generating an output time dependent upon the amplitude of said first signal, means for coupling said time dependent output to said bistable means to effect the reset state therefor, and means for integrating the set output pulse of said bistable means to provide a signal proportional to the true pulse rate of input pulses to said signal handling system.

5. The apparatus of claim 1 wherein said second signal generating means comprise bistable means coupled to said pulse train to effect a set state therefor for each of the pulses in said train, a capacitor, means coupled to said bistable means for connecting responsive to said set state of said bistable means said first signal to charge said capacitor therewith, comparator means coupled to said capacitor for producing an output responsive to a predetermined voltage across said capacitor, means connecting the output of said comparator means to effect the reset state of said bistable means therewith, and means for integrating the set output of said bistable means to provide a signal proportional to the true pulse rate of input pulses to said signal handling system.